United States Patent
Yu et al.

(10) Patent No.: US 10,611,197 B2
(45) Date of Patent: Apr. 7, 2020

(54) METHOD OF BUILDING VEHICLE DATA IN TIRE PRESSURE DIAGNOSIS TOOL

(71) Applicant: CUB ELECPARTS INC., Fuxing Township, Changhua County (TW)

(72) Inventors: San-Chuan Yu, Fuxing Township, Changhua County (TW); Jyong Lin, Fuxing Township, Changhua County (TW); Cheng-Wei Yu, Fuxing Township, Changhua County (TW); Cheng-Yu Lin, Fuxing Township, Changhua County (TW); Chih-Wen Pai, Fuxing Township, Changhua County (TW); Pei-Yu Ma, Fuxing Township, Changhua County (TW)

(73) Assignee: CUB ELECPARTS INC., Changhua County (TW)

( * ) Notice: Subject to any disclaimer, the term of this patent is extended or adjusted under 35 U.S.C. 154(b) by 0 days.

(21) Appl. No.: 15/708,533

(22) Filed: Sep. 19, 2017

(65) Prior Publication Data

US 2018/0093537 A1    Apr. 5, 2018

(30) Foreign Application Priority Data

Oct. 3, 2016    (TW) .............................. 105131959 A

(51) Int. Cl.
*B60C 23/04* (2006.01)
*B60R 16/023* (2006.01)
*G07C 5/00* (2006.01)

(52) U.S. Cl.
CPC ...... *B60C 23/0471* (2013.01); *B60C 23/0479* (2013.01); *B60R 16/023* (2013.01); *G07C 5/00* (2013.01); *G07C 5/008* (2013.01); *B60C 23/0483* (2013.01); *G07C 2205/02* (2013.01)

(58) Field of Classification Search
CPC ............ B60C 23/0471; B60C 23/0479; B60C 23/0483; B60R 16/023; G07C 5/00; G07C 5/008; G07C 2205/02
See application file for complete search history.

(56) References Cited

U.S. PATENT DOCUMENTS

| 2014/0139332 | A1* | 5/2014 | Mouchet | B60C 23/0479 340/442 |
| 2018/0072114 | A1* | 3/2018 | Lesesky | G06K 19/07758 |

\* cited by examiner

*Primary Examiner* — Courtney D Heinle
(74) *Attorney, Agent, or Firm* — Muncy, Geissler, Olds & Lowe, P.C.

(57) ABSTRACT

A method of building vehicle data in a tire pressure diagnosis tool includes: building owner information in the tire pressure diagnosis tool; entering a vehicle identification number and a tire identification number; and obtaining a tire pressure sensor identification number and a tire environment parameter value, wherein complete linking data pertaining to every owner identity and vehicle status are built in a tire pressure diagnosis tool to not only enable automobile manufacturers and automobile repair shops to effectuate vehicle maintenance and management conveniently, but also provide vehicle identification numbers and tire identification numbers to a competent authority timely and as needed.

3 Claims, 4 Drawing Sheets

METHOD OF BUILDING VEHICLE DATA IN TIRE PRESSURE DIAGNOSIS TOOL

BACKGROUND OF THE INVENTION

1. Field of the Invention

The present invention relates to vehicles and owner data building and, more particularly, to a method of building vehicle data in a tire pressure diagnosis tool.

2. Description of the Prior Art

To enhance driving safety, automobile manufacturers build an increasingly large number of conventional safety management mechanisms in terms of vehicles and tires. However, the mechanisms are distributed in separate, different management devices or management systems as for now. It is very difficult and time consuming to collect these data to use. As a result, it is necessary to provide a perfect integrated management method.

SUMMARY OF THE INVENTION

It is an objective of the present invention to provide a method of building vehicle data in a tire pressure diagnosis tool to integrate owners' and vehicles' statuses and data into a single apparatus in a manner conducive to management and maintenance.

Accordingly, a method of building vehicle data in a tire pressure diagnosis tool, provided according to the present invention, comprises: step A: building owner information in the tire pressure diagnosis tool; step B: entering a vehicle identification number; and step C: entering a tire identification number, wherein, upon completion of the steps, information obtained in each step is stored in the memory of the tire pressure diagnosis tool.

Therefore, complete linking data pertaining to every owner identity and vehicle status are built in a tire pressure diagnosis tool to enable automobile manufacturers and automobile repair shops to effectuate vehicle maintenance and management conveniently.

BRIEF DESCRIPTION OF THE DRAWINGS

Technical features of the present invention are hereunder illustrated with preferred embodiments in conjunction with the accompanying drawings, in which.

DETAILED DESCRIPTION OF THE EMBODIMENT OF THE INVENTION

Figure 1:
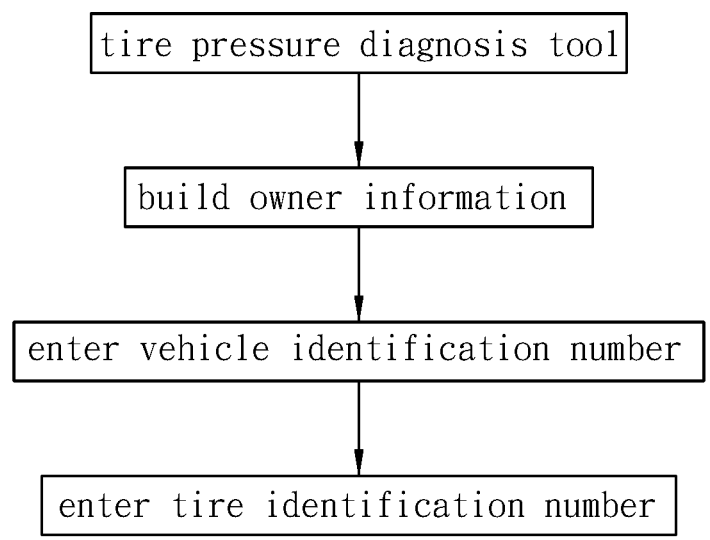
FIG. 1 is a schematic view of the process flow of the first embodiment of the present invention.
Figure 4:
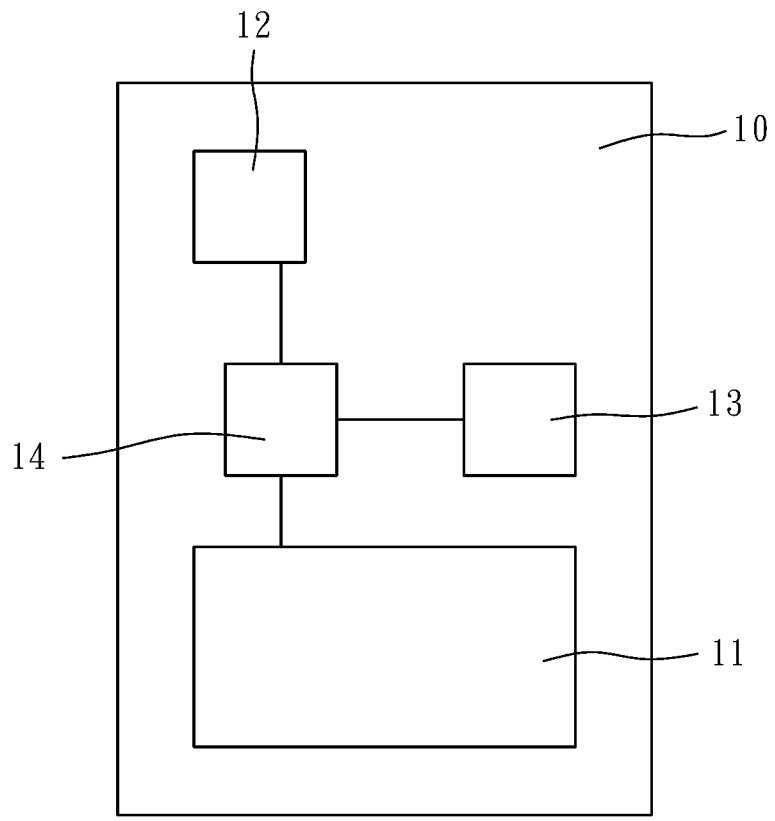
FIG. 4 is a schematic diagram of the tire pressure diagnosis tool of present invention.

Referring to FIG. 1 and FIG. 4, in the first embodiment of the present invention, a method of building vehicle data in a tire pressure diagnosis tool comprises a step of providing a tire pressure diagnosis tool, and steps A, B, C.

Providing a tire pressure diagnosis tool (10). The tire pressure diagnosis tool (10) is for use in configuring a tire pressure sensor protocol, an identification number, and an environment parameter pertaining to temperature or pressure. The tire pressure diagnosis tool comprises a MCU (14) (micro-control unit). Said MCU connects with an operating interface (11), a wireless signal transmitting and receiving module (12), and a memory (13). The tire pressure diagnosis tool is in communication with a tire pressure sensor through the wireless signal transmitting and receiving module (12). When said tire pressure diagnosis tool connects with internet, said tire pressure diagnosis tool will connect with Greenwich time automatically and modify the Greenwich time to the local time and adjust the real time clock. Said operating interface (11) can select the time area but cannot modify time artificially.

Step A: build owner information in the tire pressure diagnosis tool (10). The owner information is for identifying an owner and includes the owner's full name, nickname, phone number, postal address, or email address. The owner information is built by manual input, barcode scanning, QR scanning, or image recognition. The owner information is also built by the data from government office or compare with the data of government office.

Step B: enter a vehicle identification number. The vehicle identification number is a 17-character string of mixed numerals and alphabets and is descriptive of the brand of the vehicle. The vehicle identification number is entered by OBD (On-Board Diagnostics) reading, manual input, barcode scanning, QR scanning, or image recognition.

Step C: enter a tire identification number. In general, the tire identification number is displayed on two lateral walls of a vehicular tire and is descriptive of the tire manufacturer code as well as the dimensions, width, grade, and manufacturing date of the tire. Federal law of the United States requires that tire manufacturers display on the lateral walls of all the tires sold in the United States the permanent standardized brand-related information, including safety standard authentication and tire identification numbers issued by the U.S. Department of Transportation. The tire identification number is a string of mixed alphabets and numerals. There are some wheel factories save the tire identification number is a RFID tag or Q-R code or barcode. The tire identification number is entered by manual input, barcode scanning, QR scanning, RFID reading, or image recognition.

Upon completion of the aforesaid steps, information obtained in each step is stored in the memory (13) of the tire pressure diagnosis tool (10) as a packet. The tire pressure diagnosis tool is connected to an external storage apparatus in a wired or wireless manner to store the aforesaid information in the external storage apparatus. The external storage apparatus is a memory card, a USB flash drive, a portable hard disk drive, a compact disk, a computer, or a server.

With the method of the first embodiment of the present invention, owner-related information and vehicle-related information are integrated and converted into complete managerial data. The managerial data not only enable automobile manufacturers and automobile repair shops to effectuate vehicle maintenance and management conveniently, but also provide vehicle identification numbers and tire identification numbers to a competent authority timely and as needed.

Figure 2:
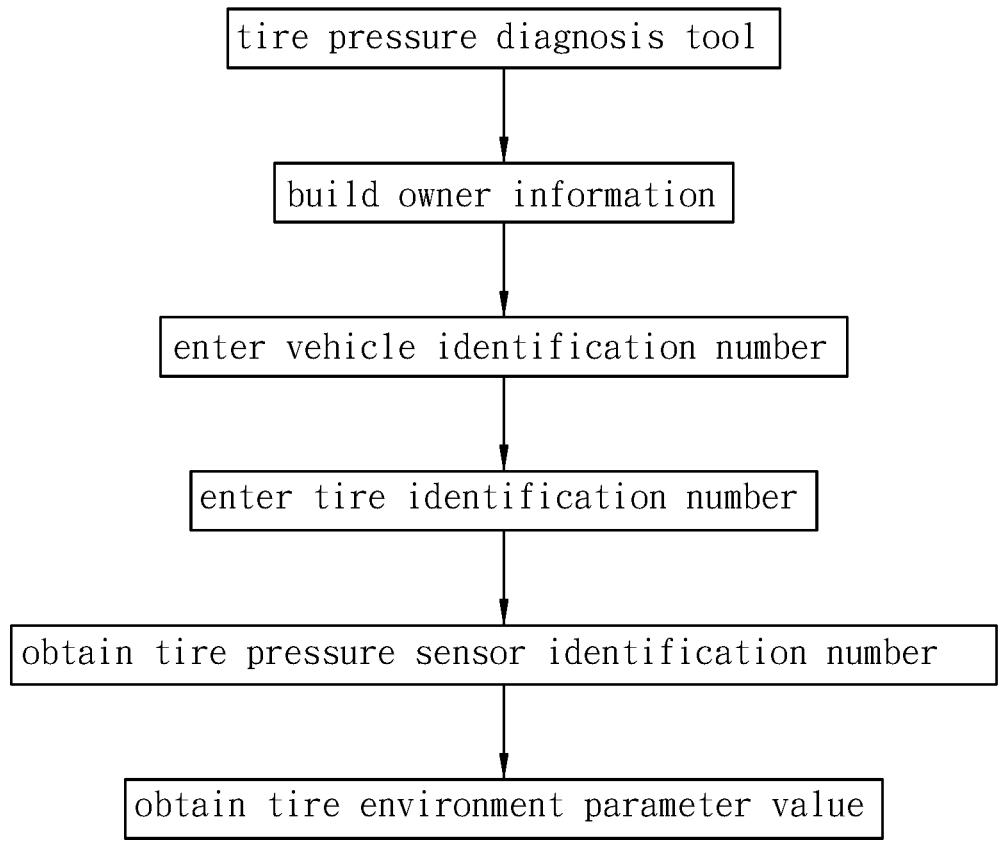
FIG. 2 is a schematic view of the process flow of the second embodiment of the present invention.

Referring to FIG. 2, in the second embodiment of the present invention, a method of building vehicle data in a tire pressure diagnosis tool comprises a step of providing a tire pressure diagnosis tool, and steps A, B, C, D, and E.

Providing a tire pressure diagnosis tool. The tire pressure diagnosis tool is for use in configuring a tire pressure sensor protocol, an identification number, and an environment parameter pertaining to temperature or pressure. The tire pressure diagnosis tool comprises a MCU and said MCU connects with an operating interface, a wireless signal transmitting receiving module, and a memory. The tire pressure diagnosis tool is in communication with a tire pressure sensor through the wireless signal transmitting and receiving module. Said tire pressure sensor protocol can connect with the internet and transmits the VIN to the data base of government office (like a supervision station) and gets a TIN from the data base. Said TIN will show on said tire pressure diagnosis tool and integrates with the owner information, local time, the tire tread depth information and save in the tire pressure diagnosis tool. All these information can transmit to a PC or NB or cell phone and shows in a chart.

Step A: build owner information in the tire pressure diagnosis tool. The owner information is for identifying an owner and includes the owner's full name, nickname, phone number, postal address, or email address. The owner information is built by manual input, barcode scanning, QR scanning, or image recognition.

Step B: enter a vehicle identification number. The vehicle identification number is a 17-character string of mixed numerals and alphabets and is descriptive of the brand of the vehicle. The vehicle identification number is entered by OBD reading, manual input, barcode scanning, QR scanning, or image recognition.

Step C: enter a tire identification number. In general, the tire identification number is displayed on two lateral walls of a vehicular tire and is descriptive of the tire manufacturer code as well as the dimensions, width, grade, and manufacturing date of the tire. Federal law of the United States requires that tire manufacturers display on the lateral walls of all the tires sold in the United States the permanent standardized brand-related information, including safety standard authentication and tire identification numbers issued by the U.S. Department of Transportation. The tire identification number is a string of mixed alphabets and numerals. There are some wheel factories save the tire identification number in a RFID tag or Q-R code or barcode. The tire identification number is entered by manual input, barcode scanning, QR scanning, RFID reading, or image recognition.

Step D: obtain a tire pressure sensor identification number. The tire pressure sensor identification number is a unique identifier for each tire pressure sensor. The tire pressure sensor identification number is entered by manual input, barcode scanning, or QR scanning. Alternatively, the tire pressure sensor identification number is entered as soon as the tire pressure diagnosis tool sends a low-frequency wireless signal to trigger the tire pressure sensors to respond. With the low-frequency wireless signal sent from the tire pressure diagnosis tool, the tire pressure sensors are either triggered one by one or triggered once to collectively respond. Therefore, to obtain four tire pressure sensor identification numbers, it is feasible to trigger the tire pressure sensors one by one and thus obtain the tire pressure sensor identification numbers one by one or trigger once so that the four tire pressure sensors each respond once to obtain four tire pressure sensor identification numbers.

Step E: obtain a tire environment parameter value. The tire pressure diagnosis tool sends a low-frequency wireless signal to trigger the tire pressure sensors to respond. The tire pressure sensors are either triggered one by one or triggered once to collectively respond. When triggered by the low-frequency signal of the tire pressure diagnosis tool, each tire pressure sensor sends a response signal. The response signal is descriptive of the status of power storage of the tire pressure sensor and carries environment parameter values detected by the tire pressure sensor. The environment parameters are, for example, temperature, pressure.

Upon completion of the aforesaid steps, information obtained in each step is stored in the memory of the tire pressure diagnosis tool. These information can be stored in the memory separately or as a packet. The tire pressure diagnosis tool is connected to an external storage apparatus in a wired or wireless manner to store the aforesaid information in the external storage apparatus. The external storage apparatus is a memory card, a USB flash drive, a portable hard disk drive, a compact disk, a computer, or a server.

With the method of the second embodiment of the present invention, owner-related information and vehicle-related information are integrated and converted into complete managerial data. The managerial data not only enable automobile manufacturers and automobile repair shops to effectuate vehicle maintenance and management conveniently, but also provide vehicle identification numbers and tire identification numbers to a competent authority timely and as needed.

Figure 3:
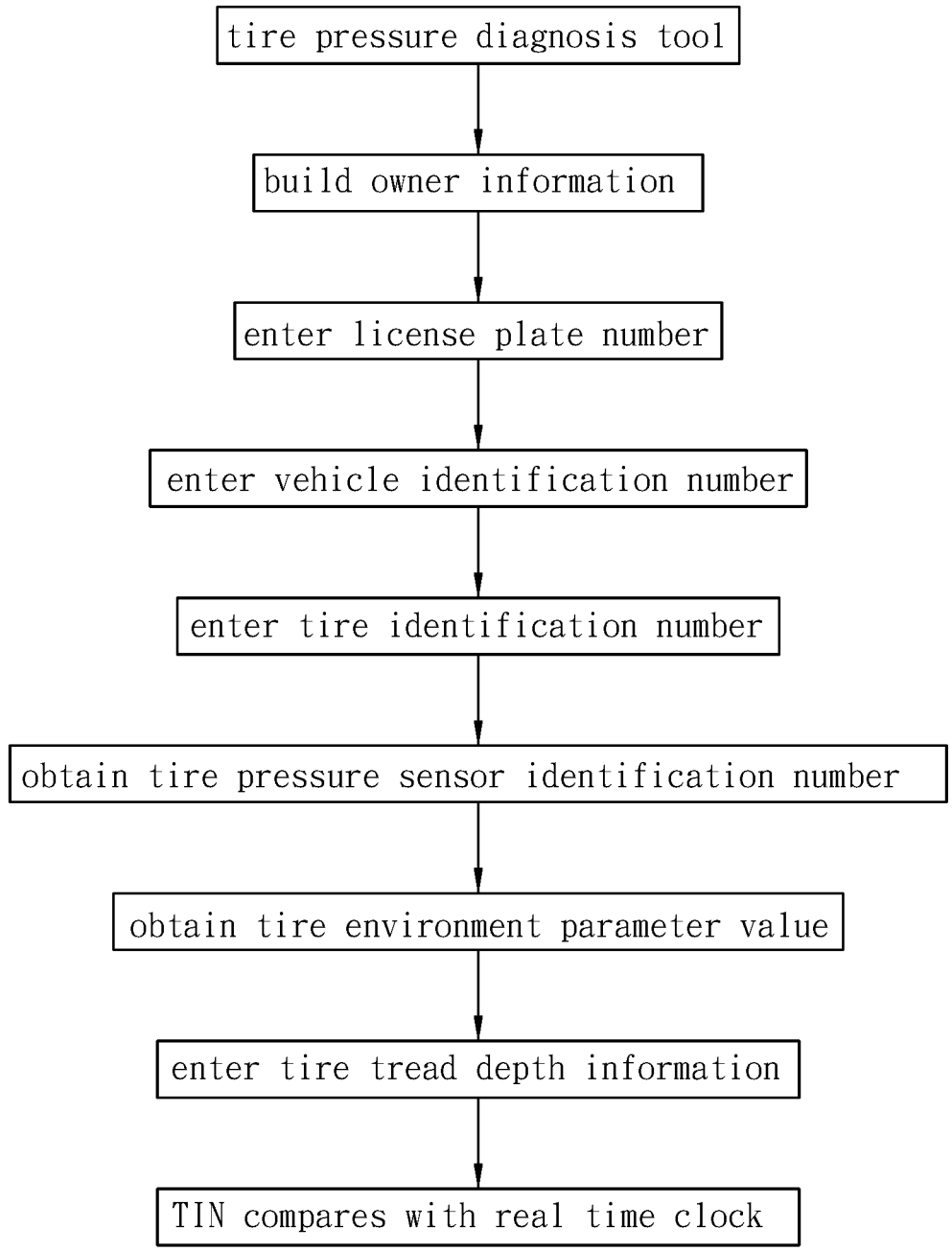
FIG. 3 is a schematic view of the process flow of the third embodiment of the present invention.

Referring to FIG. 3, in the third embodiment of the present invention, the method of building vehicle data in a tire pressure diagnosis tool comprises a step of providing a tire pressure diagnosis tool, and steps A, F, B, C, D, E, G, and H.

The tire pressure diagnosis tool is for use in configuring a tire pressure sensor protocol, an identification number, and an environment parameter pertaining to temperature, pressure. The tire pressure diagnosis tool comprises a MCU and said MCU connects with an operating interface, a wireless signal transmitting receiving module, and a memory.

Step A: build owner information in the tire pressure diagnosis tool. The owner information is for identifying an owner and includes the owner's full name, nickname, phone number, postal address, or email address. The owner information is built by manual input, barcode scanning, QR scanning, or image recognitions.

Step F: enter a license plate number. The license plate number is entered by manual input, barcode scanning, QR scanning, or image recognition.

Step B: enter a vehicle identification number. The vehicle identification number is a 17-character string of mixed numerals and alphabets and is descriptive of the brand of the vehicle. The vehicle identification number is entered by OBD reading, manual input, barcode scanning, QR scanning, or image recognition.

Step C: enter a tire identification number. In general, the tire identification number is displayed on two lateral walls of a vehicular tire or save in a RFID tag, a QR code or barcode and is descriptive of the tire manufacturer code as well as the dimensions, width, grade, and manufacturing date of the tire. The tire identification number is entered by manual input, barcode scanning, QR scanning, RFID reading, or image recognition.

Step D: obtain a tire pressure sensor identification number. The tire pressure sensor identification number is a unique identifier for each tire pressure sensor. The tire pressure sensor identification number is entered by manual input, barcode scanning, or QR scanning. Alternatively, the tire pressure sensor identification number is entered as soon as the tire pressure diagnosis tool sends a low-frequency wireless signal to trigger the tire pressure sensors to respond. With the low-frequency wireless signal sent from the tire pressure diagnosis tool, the tire pressure sensors are either triggered one by one or triggered once to collectively respond. Therefore, to obtain four tire pressure sensor identification numbers, it is feasible to trigger the tire pressure sensors one by one and thus obtain the tire pressure sensor identification numbers one by one or trigger once so that the four tire pressure sensors each respond once to obtain four tire pressure sensor identification numbers.

Step E: obtain a tire environment parameter value. The tire pressure diagnosis tool sends a low-frequency wireless signal to trigger the tire pressure sensors to respond. The tire pressure sensors are either triggered one by one or triggered once to collectively respond. When triggered by the low-frequency signal of the tire pressure diagnosis tool, each tire pressure sensor sends a response signal. The response signal is descriptive of the status of power storage of the tire pressure sensor and carries environment parameter values detected by the tire pressure sensor. The environment parameters are, for example, temperature, pressure.

Step G: enter a tire tread depth information. The tire tread depth information is either measured manually and then entered manually or measured with a measurement apparatus, such as a caliper, and then resultant data is entered in a wired or wireless manner and automatically into the tire pressure diagnosis tool.

Step H: according to information of the TIN, said MCU compares a date given by the real time clock inside tire pressure diagnosis tool with the manufacturing date of the tire in Step C to determine the tire is in the period of use or not. If the tire is out of the period of use, the tire pressure diagnosis tool will send a warning signal. The warning signal can be a sound or a light signal.

Upon completion of the aforesaid steps, information obtained in each step is stored in the memory of the tire pressure diagnosis tool. The tire pressure diagnosis tool is connected to an external storage apparatus in a wired or wireless manner to store the aforesaid information in the external storage apparatus. The external storage apparatus is a memory card, a USB flash drive, a portable hard disk drive, a compact disk, a computer, or a server.

Unlike the second embodiment of the present invention, the third embodiment of the present invention requires building owner information in step A, entering a license plate number before step B, obtaining both a tire environment parameter and the status of power storage of the tire pressure sensor in step E, and entering both internal tire information and tire tread depth information in step G and the period of use in step H to allow a manager or technician to gain insight into the internal and external statuses of each tire of each vehicle.

In each of the above embodiments, it is also feasible for step A to follow step C, that is, entering a tire identification number, and then entering a vehicle identification number.

What is claimed is:

1. A method of building vehicle data in a tire pressure diagnosis tool, comprising:
    providing a tire pressure diagnosis tool comprising a MCU, said MCU connected with an operating interface, a wireless signal transmitting receiving module, and a memory, with the tire pressure diagnosis tool being in communication with a tire pressure sensor through the wireless signal transmitting and receiving module;
    step A: building owner information in the tire pressure diagnosis tool, the owner information being for identifying an owner's identity;
    step B: entering a vehicle identification number, the vehicle identification number being a 17-character string of mixed numerals and alphabets; and
    step C: entering a tire identification number descriptive of dimensions and a manufacturing date of a tire, the tire identification number being entered by manual input, barcode scanning, or QR scanning or image recognition;
    wherein, upon completion of the steps A, B and C, information obtained in each step is stored in the memory of the tire pressure diagnosis tool,
    step D: obtaining a tire pressure sensor identification number;
    step E: obtaining a tire environment parameter value, with the tire environment parameter being temperature and pressure detected by the tire pressure sensor;
    step G: entering tire tread depth information, and the tire tread depth information is either measured manually and then entered manually or measured with a measurement apparatus and then resultant data is entered automatically into the tire pressure diagnosis tool; and
    step H: according to information of a tire identification number (TIN), determining the tire being in a manufacture specified period of use or not by comparing a date given by a real time clock with the manufacturing date of the tire, if the tire is out of the manufacture specified period of use, the tire pressure diagnosis tool will send a warning signal.

2. The method of claim 1, wherein, in step D, when triggered once, all the tire pressure sensors respond.

3. The method of claim 1, further comprising step F between step A and step B: entering a license plate number by one of manual input, barcode scanning, QR scanning, and image recognitions.

* * * * *